April 12, 1927.

F. M. VENZIE 1,624,191

MOLD FOR CEMENTITIOUS CONDUIT

Filed July 22, 1925   2 Sheets-Sheet 1

WITNESS:
Rob R Kitchel

INVENTOR
Frederick M. Venzie
BY
William J Jackson
ATTORNEY.

April 12, 1927.

F. M. VENZIE

MOLD FOR CEMENTITIOUS CONDUIT

Filed July 22, 1925   2 Sheets-Sheet 2

1,624,191

WITNESS:

INVENTOR
Frederick M. Venzie
BY
ATTORNEY.

Patented Apr. 12, 1927.

1,624,191

UNITED STATES PATENT OFFICE.

FREDERICK M. VENZIE, OF PHILADELPHIA, PENNSYLVANIA.

MOLD FOR CEMENTITIOUS CONDUITS.

Application filed July 22, 1925. Serial No. 45,163.

This invention relates to pipes or conduits and has more especial relation to pipes or conduits molded of cementitious material, as concrete.

The leading object of the present invention is to provide a novel form of pipe or conduit of concrete or the like which may be molded expeditiously, cheaply and in any desired size, either standard or unusual sizes, and in which joints between such pipes or conduits may be effectually and quickly sealed to prevent leakage after installation.

A further object resides in the provision of general details of construction and in the arrangement, combination and connection of parts for attaining the results sought by said leading object.

Other and further objects not at this time more particularly pointed out will be hereinafter referred to.

The invention consists of the novel construction hereinafter described and finally claimed.

The nature, characteristic features and scope of the invention will be more fully understood from the following description taken in connection with the accompanying drawings forming part hereof, and in which.

For the purpose of illustrating my invention I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of the instrumentalities as herein shown and described.

Figure 1:
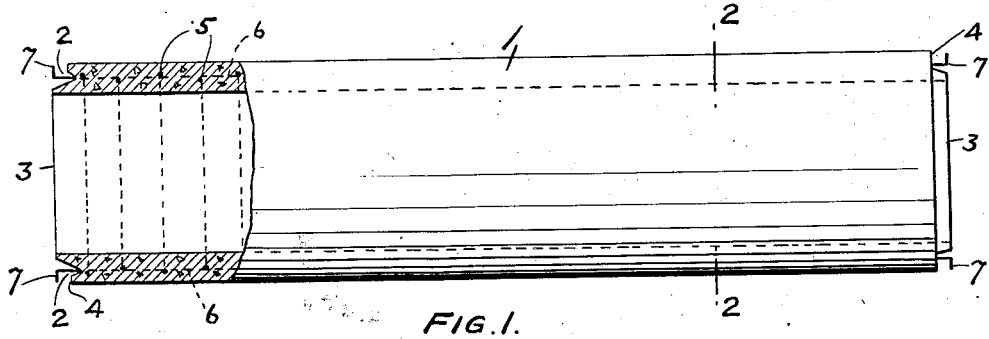
Fig. 1, is a view in elevation, partly sectioned, of a section of pipe or conduit embodying the invention.
Figures 2, 5:
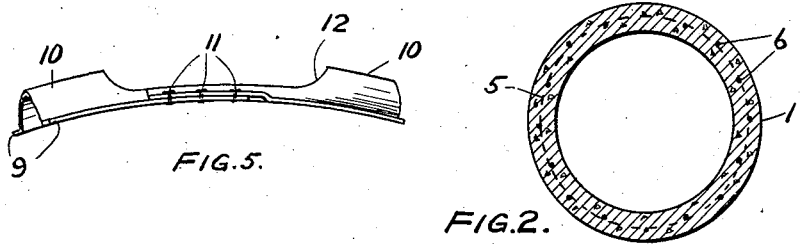
Fig. 2, is a view in section taken upon the line 2—2 of Fig. 1.
Fig. 5, is a fragmentary view in perspective of the ring used in the pouring of the sealing cement.
Figure 3:
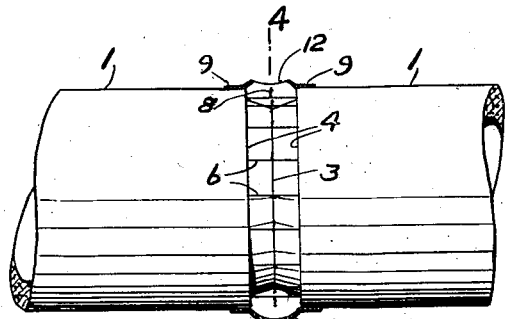
Fig. 3, is a fragmentary view of two sections of pipe fitted together ready to receive the sealing cement.
Figure 4:
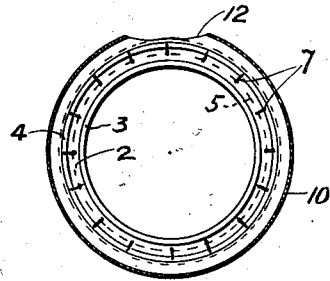
Fig. 4, is a view in section taken upon the line 4—4 of Fig. 3.
Figure 6:
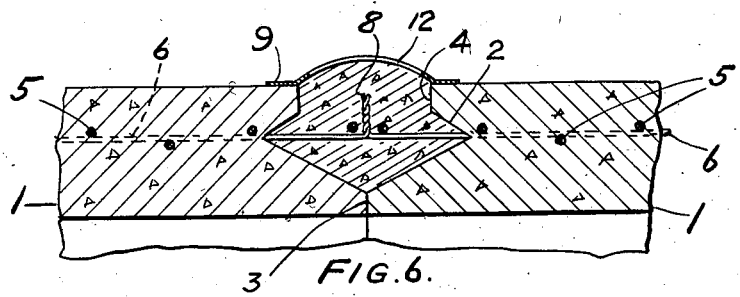
Fig. 6, is a fragmentary view in section of the finished joint between two pipe sections.
Figure 8:
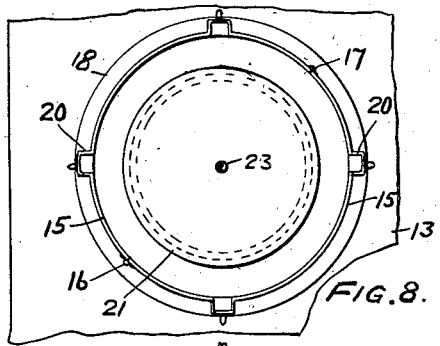
Fig. 8, is a top view of the mold with the top cap omitted.
Figure 9:
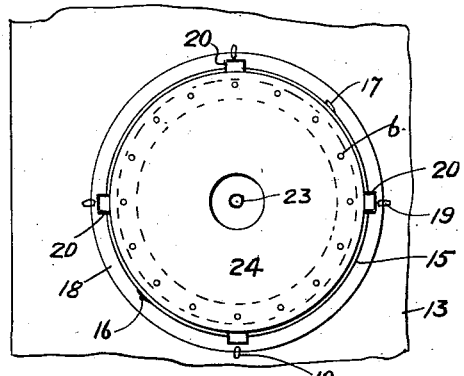
Fig. 9, is a similar view showing the top cap in position.
Figure 7:
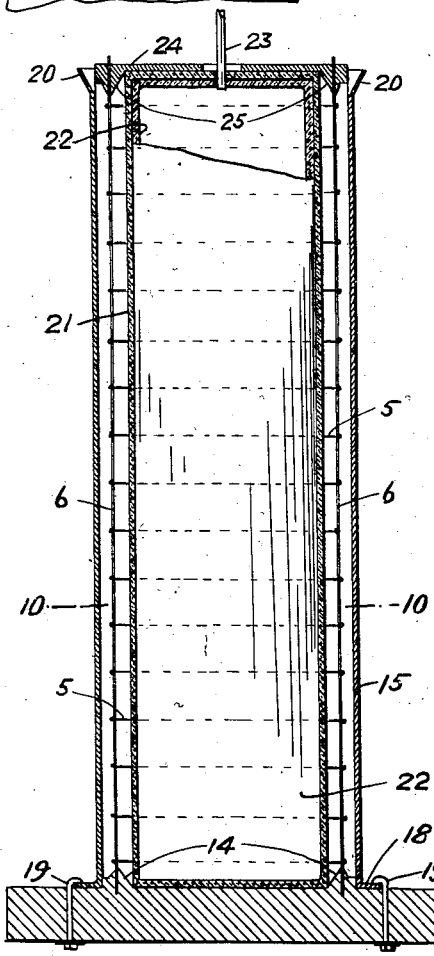
Fig. 7, is a view in vertical section of apparatus for molding my novel pipe.
Figure 10:
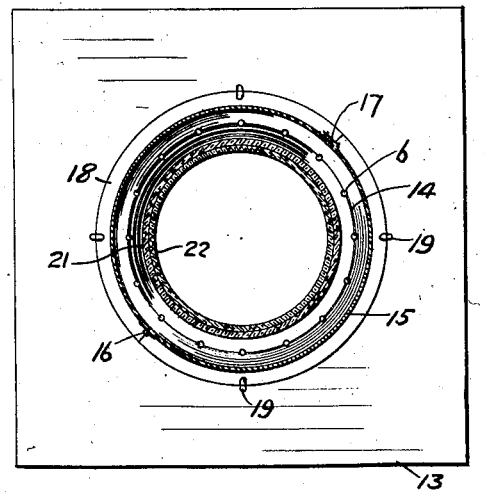
Fig. 10, is a view in section taken upon the line 10—10 of Fig. 7.

Referring now more particularly to Figs. 1 to 6 inclusive, I will describe my novel pipe or conduit and manner of effecting joints thereof and hereinafter will describe with reference to the remaining figures of the drawing my novel apparatus for molding a pipe or conduit of the class under consideration. In the drawings the reference numeral 1 designates a section of pipe or conduit formed of cementitious material as concrete. Each end of a section is provided with a substantially V-shaped notched part 2 which is annularly arranged. The parts of each V-shaped end are not formed in alignment but are formed so that the part 3 projects beyond the part 4, see Fig. 6. In fitting pipes together the parts 3—3 assume an abutting position so that an annular space is provided by the separated parts 4—4 of the pipes. Considered annularly and longitudinally reinforcing members as wires 5 and 6 are embedded in the concrete of the pipe sections. The longitudinal wires 6 project from each end of a pipe section, through the V-shaped notches and are bent over at right angles as at 7, see Fig. 1. With the pipe sections aligned as in Fig. 2, these bent over parts of adjacent pipes are twisted together as at 8, see Fig. 6, to tie two pipes together. To effect a sealing of joined pipe ends I employ a ring comprised of annular flanges 9 bridging which is an annular, convexed part 10 which encircles the space between the parts 4—4 of the pipes. The ring is split as shown in Fig. 5 and when fitted around the pipes may be secured together by cotter pins 11 or the like. The ring is provided with an opening 12 to permit pouring of cement entirely around the annular V-shaped parts of the ends of the pipes, see Fig. 6. The ring is removed after set of the cement takes place and there is provided a joint immune to leakage. Aside from this, any desired size of pipe may be molded which is important since ordinarily only standard sizes are obtainable.

Taking up now my novel mold for manufacture of the above described pipe and manner of molding, reference may be had to Figs. 7 to 10 inclusive. The reference numeral 13 designates a base of suitable material, as wood, having an annular, inverted V-shaped rib 14. Removably clamped upon said base is a two-part, tubular casing 15 the parts of which are hinged at 16 and overlap as at 17. The bottom of the casing is flanged at 18 and may be secured to the base 13 by clamps 19. The upper rim of casing 15 is provided with cement pouring spouts 20. Within casing 15 is a hollow cylinder 21 of rubber closed top and bottom and spaced from the side walls of casing 15. Within cylinder 21 is a second cylinder 22 of rubber communicating with the interior of which is a pipe 23 for conducting air thereto. To mold my novel pipe I first insert the reinforcing frame comprised of the wires 5 and 6, the wires 6 being accommodated at their bottoms by openings in the rib 14 of base 13. The top cap 24 is then fitted to the top of casing 15 which cap upon its under side is provided with a V-shaped rib 25 apertured for the penetration of wires 6 and pipe 23. Cement is then poured through the spouts 20 to form the pipe walls around the wires 5—6. In the respect it is to be noted that the ribs 14—25 form the V-shaped notches of the respective ends of the pipes and that the two cylinders of rubber are inflated. With the concrete poured and set, air is exhausted from cylinder 22, the parts of the hinged casing opened, the top lifted and the reinforced pipe removed, the clamps 19 of course being first loosened. The purpose of two rubber cylinders is as follows: If but one cylinder was employed it would have to be of such heavy material to retain the pipe being formed in proper shape that deflation and inflation would be impracticable. However, by using two cylinders of relatively thin rubber not only is stability secured to form the pipe but inflation and deflation may be readily secured.

It is apparent that thus, molds for various sizes of pipes may be readily and cheaply built from which many varied sizes of pipes may be molded. Such molds may be used at the place of installing pipes or conduits which is also an important item relieving freight, express and hauling charges, thus tending to hasten work and cheapen installation. Other advantages are apparent such as obtaining desired sizes and the like.

It will now be apparent that I have devised a novel and useful construction which embodies the features of advantage enumerated as desirable in the statement of the invention and the above description and while I have in the present instance shown and described the preferred embodiment thereof which has been found in practice to give satisfactory and reliable results, it is to be understood that the same is susceptible of modification in various particulars without departing from the spirit or scope of the invention or sacrificing any of its advantages.

What I claim is:

1. A form for molding cementitious conduits comprising a base, a separable outer and rigid casing mounted thereon, an inflatable core, arranged within and spaced from the side walls of the outer casing, a removable cap for the top of said casing, the said cap and base each being provided with an annular V-shaped portion projecting into the space between said casing and core and means for inflating said core.

2. A form for molding cementitious conduits comprising a base, a separable outer and rigid casing mounted thereon, an inflatable core comprising a pair of relatively thin rubber cylinders fitted one within the other said core being arranged within and spaced from the side walls of the outer casing, a removable cap for the top of said casing, the said cap and base each being provided with an annular V-shaped portion projecting into the space between said casing and core, and means for inflating said core.

In testimony whereof, I have hereunto signed my name.

FREDERICK M. VENZIE.